(12) United States Patent
Ishihara (10) Patent No.: US 12,227,032 B2
(45) Date of Patent: Feb. 18, 2025

(54) PNEUMATIC TIRE

(71) Applicant: BRIDGESTONE CORPORATION, Tokyo (JP)

(72) Inventor: Nobuyuki Ishihara, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 329 days.

(21) Appl. No.: 17/762,181

(22) PCT Filed: Sep. 30, 2020

(86) PCT No.: PCT/JP2020/037246
§ 371 (c)(1),
(2) Date: Mar. 21, 2022

(87) PCT Pub. No.: WO2021/085022
PCT Pub. Date: May 6, 2021

(65) Prior Publication Data
US 2022/0371379 A1 Nov. 24, 2022

(30) Foreign Application Priority Data
Oct. 29, 2019 (JP) ................................ 2019-195799

(51) Int. Cl.
*B60C 11/11* (2006.01)
*B60C 11/12* (2006.01)
(Continued)

(52) U.S. Cl.
CPC ............... *B60C 11/12* (2013.01); *B60C 11/11* (2013.01); *B60C 11/1281* (2013.01);
(Continued)

(58) Field of Classification Search
CPC ..... B60C 11/11; B60C 11/12; B60C 11/1281; B60C 2011/0348; B60C 2011/133
See application file for complete search history.

(56) References Cited

U.S. PATENT DOCUMENTS 5,031,680 A * 7/1991 Kajikawa .............. B60C 11/033
152/902
2012/0273105 A1 11/2012 Ducci et al.
(Continued)

FOREIGN PATENT DOCUMENTS

CN 106068192 A 11/2016
CN 106457922 A 2/2017
(Continued)

OTHER PUBLICATIONS

Machine translation for Japan 2007-099110 (Year: 2024).*
(Continued)

*Primary Examiner* — Steven D Maki
(74) *Attorney, Agent, or Firm* — Sughrue Mion, PLLC (57) ABSTRACT

A pneumatic tire can suppress uneven wear of the tire and improve the performance on snow. A plurality of inner side circumferential grooves (11*a*, 11*b*, 11*c*) arrayed between a pair of outermost side circumferential grooves (11*d*, 11*d*) have a groove width that is smaller than that of the outermost side circumferential grooves (11*d*) to such a degree allowing land portions on the opposite sides thereof to come into contact with each other upon grounding. A plurality of recessed portions (S) of a shape cut in a radial direction from a tread face are formed along the tire circumferential direction on opposing block wall faces (14A*f*, 14B*f*) of blocks (14A, 14B) on the opposite sides of at least one (11*b*) of the inner side circumferential grooves.

4 Claims, 6 Drawing Sheets

(51) Int. Cl.
*B60C 11/01* (2006.01)
*B60C 11/03* (2006.01)
*B60C 11/13* (2006.01)

(52) U.S. Cl.
CPC . *B60C 2011/013* (2013.01); *B60C 2011/0344* (2013.01); *B60C 2011/0348* (2013.01); *B60C 2011/133* (2013.01)

(56) References Cited

U.S. PATENT DOCUMENTS

| | | | |
|---|---|---|---|
| 2012/0305155 A1* | 12/2012 | Hamanaka | B60C 11/1204 152/209.18 |
| 2014/0110027 A1 | 4/2014 | Kleffmann et al. | |
| 2014/0360639 A1 | 12/2014 | Fujioka | |
| 2018/0186193 A1* | 7/2018 | Kitani | B60C 11/1281 |
| 2019/0225030 A1 | 7/2019 | Pizzorno et al. | |

FOREIGN PATENT DOCUMENTS

| | | |
|---|---|---|
| JP | 2-53608 A | 2/1990 |
| JP | 04-191104 A | 7/1992 |
| JP | 06-227211 A | 8/1994 |
| JP | 07-215017 A | 8/1995 |
| JP | 2000-177330 A | 6/2000 |
| JP | 2007-099110 A * | 4/2007 |
| JP | 2008-201368 A | 9/2008 |
| JP | 2013-505171 A | 2/2013 |
| JP | 2015-054594 A | 3/2015 |
| JP | 2017-124773 A | 7/2017 |
| JP | 2019-073162 A | 5/2019 |
| JP | 2019-119267 A | 7/2019 |
| JP | 2019-137088 A | 8/2019 |
| WO | 2013/051053 A1 | 4/2013 |
| WO | 2015/056573 A1 | 4/2015 |
| WO | 2015/190206 A1 | 12/2015 |
| WO | 2019/087980 A1 | 5/2019 |

OTHER PUBLICATIONS

International Search Report for PCT/JP2020/037246 dated Dec. 1, 2020 [PCT/ISA/210].
Written Opinion for PCT/JP2020/037246 dated Dec. 1, 2020 [PCT/ISA/237].
Extended European Search Report dated Feb. 10, 2023, issued in European Application No. 20883334.3.

* cited by examiner

PNEUMATIC TIRE

CROSS REFERENCE TO RELATED APPLICATIONS

This application is a National Stage of International Application No. PCT/JP2020/037246 filed Sep. 30, 2020, claiming priority based on Japanese Patent Application No. 2019-195799 filed Oct. 29, 2019.

TECHNICAL FIELD

The present invention relates to a pneumatic tire, and particularly to a pneumatic tire that has a performance on ice and snow.

BACKGROUND ART

In a tire of studless specifications that takes performance on ice and snow into consideration, a traction pattern is well known, wherein land portions, which are partitioned by circumferential grooves on a tire tread and are continuous in the circumferential direction, are divided into a plurality of blocks by widthwise grooves and sipes are formed in each block.

The widthwise grooves have a high performance on ice and snow due to snow column shearing force that obtains driving force by grasping snow and kicking snow columns which have been treaded down, an edge effect of block edges or corners, and snow removal.

Meanwhile, the sipes can improve the traction performance by eliminating a water film formed between the road surface and the tire by water absorption, and by tearing the road surface water film by edge portions of the sipes such that the tire contacts directly with the road surface.

However, the traction pattern that takes the performance on snow described above into consideration has an underlying problem in uneven wear of the blocks (heel-and-toe uneven wear by which the kicking side of the blocks is worn greatly).

To cope with the problem, there has been proposed a tire in which improvement is sought in uneven wear resistance together with a performance on snow and ice (for example, refer to Patent Document 1).

PRIOR ART DOCUMENT

Patent Document

[Patent Document 1]
 WO 2015/056573 A1

In the pneumatic tire disclosed in Patent Document 1, the groove width of a plurality of inner side circumferential grooves, provided between a pair of outermost side circumferential grooves on the outermost sides in the tire widthwise direction from among circumferential grooves, is reduced such that inner side land portions, formed between the pair of outermost side circumferential grooves, are displaced to the middle of the tire in the tire widthwise direction to make the inner side land portions dense.

The inner side land portions on the opposite sides of the inner side circumferential groove of the reduced groove width easily come into contact with each other upon grounding, whereby the plurality of inner side land portions is integrated with each other to thereby increase the rigidity as a whole. Consequently, even if small segmented blocks formed by segmentation with the sipes are acted upon by a high ground contact pressure, the inner side land portions are prevented from being deformed greatly, and also heel-and-toe uneven wear is suppressed.

SUMMARY OF THE INVENTION

Underlying Problem to be Solved by the Invention

However, when deformation of the segmented blocks is suppressed, the edge pressure of ends of the segmented blocks decreases, deteriorating the traction performance on snow.

Further, each of the inner side circumferential grooves extending in the tire circumferential direction other than the widthwise grooves is formed from a groove bottom face and groove side faces parallel to each other and therefore cannot be expected to have snow column shearing force and an edge effect.

The present invention has been made in view of such problem as above described, and it is an object of the present invention to provide a pneumatic tire that can suppress uneven wear thereof and can further improve the performance on snow.

Means to Solve the Problem

In order to achieve the object described above, the present invention provides a pneumatic tire in which a tread of the tire is partitioned into a plurality of land portions that are continuous in a tire circumferential direction, by a plurality of circumferential grooves extending in the tire circumferential direction, the land portions continuous in the tire circumferential direction are divided into a plurality of blocks by a plurality of widthwise grooves extending in a tire widthwise direction, and the blocks are segmented in a plurality of segmented blocks by a plurality of widthwise sipes extending in the tire widthwise direction, characterized in that:

the circumferential grooves include a pair of outermost side circumferential grooves on outermost sides in the tire widthwise direction and a plurality of inner side circumferential grooves arrayed between the outermost side circumferential grooves, the inner side circumferential grooves have a groove width that is smaller than that of the outermost side circumferential grooves, to such a degree to allow the land portions on opposite sides thereof to come into contact with each other upon grounding, and a plurality of recessed portions of a shape cut in a radial direction from a tread face are formed along the tire circumferential direction on block wall faces, which are opposed to each other, of the blocks on opposite sides of at least one of the inner side circumferential grooves.

According to this feature, the groove width of the plurality of inner side circumferential grooves is made smaller such that the inner side land portions are displaced to the middle in the tire widthwise direction to be dense. Therefore, the inner side land portions on the opposite sides of the inner side circumferential grooves of the smaller groove width are caused to contact with each other upon grounding. Consequently, even though the block side faces have the recessed portions, the plurality of inner side land portions are integrated with each other to increase the rigidity as a whole. Hence, even if the small, segmented blocks segmented by the sipes are acted upon by a high ground contact pressure, they are suppressed from being deformed greatly, and also the heel-and-toe uneven wear is suppressed.

Further, the plurality of recessed portions of a shape cut in the radial direction from the tread face are formed in the tire circumferential direction on the opposed block wall faces of the blocks on the opposite sides of the inner side circumferential grooves. Therefore, to snow column shearing force generated by the widthwise grooves, snow column shearing force to snow columns generated by the recessed portions of the block wall faces is added, and consequently, the performance on snow is further improved.

There is also provided an edge effect of the tread face opening edges of the recessed portions of the blocks.

In a preferred embodiment of the present invention, the recessed portions are formed at positions that are displaced in the tire circumferential direction from and do not overlap with the widthwise grooves that divide the land portions to which the recessed portions are opposed across the inner side circumferential groove.

According to this feature, the recessed portions are formed at positions that are displaced in the tire circumferential direction from and do not overlap with the widthwise grooves that divide the land portions to which the recessed portions are opposed across the inner side circumferential groove. Therefore, upon grounding, the recessed portions have their openings closed by contact of opening end faces of the recessed portions with the block wall faces opposed to them. Consequently, the snow column shearing force to snow columns formed by the recessed portions having the closed openings acts effectively, and the block ends that are deformed much upon grounding do not directly have an influence on the recessed portions. Consequently, concentration of distortion upon the angular portions of the recessed portions of the blocks can be suppressed, and occurrence of a crack from the angular portions can be suppressed.

In the preferred embodiment of the present invention, the recessed portions are formed at positions that are displaced in the tire circumferential direction from and do not overlap with widthwise sipes formed on the blocks that have the recessed portions.

According to this feature, the recessed portions are formed at positions that are displaced in the tire circumferential direction from and do not overlap with the widthwise sipes formed on the blocks that have the recessed portions. Therefore, upon grounding, the segmented block ends that are deformed much upon grounding are prevented from having a direct influence on the recessed portions, by the widthwise sipes. Consequently, concentration of distortion upon the angular portions of the recessed portions of the segmented blocks can be suppressed, and occurrence of a crack from the angular portions can be suppressed.

In the preferred embodiment of the present invention, the recessed portions have a widthwise dimension in the tire widthwise direction, and the widthwise dimension is, at tire circumferential positions of the blocks at which the recessed portions are formed, equal to or greater than 5% and equal to or smaller than 25% of a block width of the blocks in the tire widthwise direction.

According to this feature, the widthwise dimension of the recessed portions in the tire widthwise direction is, at the positions of the blocks in the tire circumferential direction at which the recessed portions are formed, equal to or greater than 5% but equal to or smaller than 25% of the block width of the blocks in the tire widthwise direction, the block width including the widthwise dimension of the recessed portion. Therefore, the snow column shearing force is secured by the recessed portions. Further, when the blocks on the opposite sides of the inner side circumferential groove of a small groove width are contacted and integrated with each other upon grounding, sufficient rigidity is secured, deformation is suppressed, and also occurrence of a crack at the angular portions of the recessed portion is suppressed.

According to the preferred embodiment of the present invention, the recessed portions have a circumferential length in the tire circumferential direction, and the circumferential length is, at tire widthwise positions of the blocks at which the recessed portions are formed, equal to or greater than 5% and equal to or smaller than 35% of a block length of the blocks in the tire circumferential direction.

According to this feature, the circumferential length of the recessed portions in the tire circumferential direction is, at the position of the blocks in the tire widthwise direction at which the recessed portions are formed, equal to or greater than 5% but equal to or smaller than 35% of the block length of the blocks in the tire circumferential direction. Therefore, the snow column shearing force is secured by the recessed portions. Further, when the blocks on the opposite sides of the inner side circumferential groove of a small groove width are contacted and integrated with each other upon grounding, sufficient rigidity is secured, deformation is suppressed, and also occurrence of a crack at the angular portions of the recessed portion is suppressed.

Effects of the Invention

According to the present invention, since the groove width of the plurality of inner side circumferential grooves is made smaller such that the inner side land portions are displaced to the middle in the tire widthwise direction to be dense, the inner side land portions on the opposite sides of the inner side circumferential grooves of the smaller groove width are contacted with each other upon grounding. Consequently, even though the block side faces have the recessed portions, the plurality of inner side land portions are integrated with each other to increase the rigidity as a whole. Consequently, even if the segmented blocks segmented by the sipes are acted upon by a high ground contact pressure, they are suppressed from being deformed greatly, and also the heel-and-toe uneven wear is suppressed.

Further, on the inner side circumferential grooves, the recessed portions of a shape cut in the radial direction from the tread face are formed on the opposed block wall faces of the blocks on the opposite sides of the inner side circumferential grooves. Therefore, to snow column shearing force generated by the widthwise grooves, snow column shearing force generated by the recessed portions is added, and consequently, the performance on snow is further improved.

There is also provided an edge effect of the tread face opening edges of the recessed portions of the blocks.

MODES FOR CARRYING OUT THE INVENTION

An embodiment according to the present invention will now be described with reference to FIGS. 1 to 4.

Figure 1:
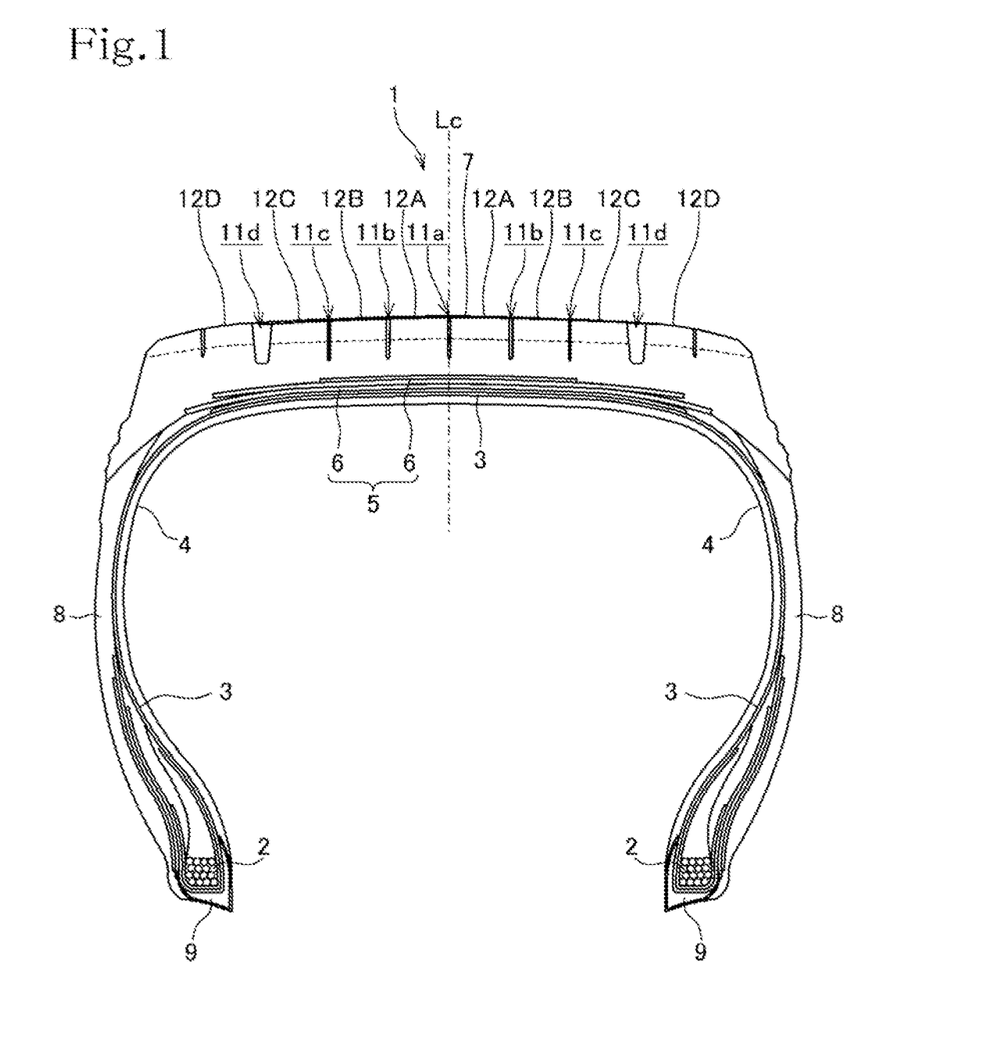
FIG. 1 is a cross sectional view in a tire widthwise direction of a pneumatic tire according to an embodiment of the present invention.

FIG. 1 is a cross sectional view, in a tire widthwise direction, of a pneumatic tire 1 according to the present embodiment that is a radial tire for heavy load for trucks or buses (the view being a sectional view taken along a plane including a tire rotational center axis).

The pneumatic tire 1 includes a pair of left and right bead rings 2 each formed from a metal wire wound in a ring shape, and a carcass ply 3 is formed such that the opposite side edges thereof are wound on the bead rings 2 while a portion thereof between the opposite side edges swells to the outer side in tire diametrical directions such that the carcass ply 3 is formed in a toroidal shape.

An air permeable inner liner portion 4 is formed on the inner surface of the carcass ply 3.

A plurality of belts 6 are placed on each other and wound on an outer periphery of a crown portion of the carcass ply 3 to form a belt layer 5, and a tread 7 is formed on the outer side of the belt layer 5 in a tire diametrical direction in such a manner to cover the belt layer 5.

The belt layer 5 is formed from the belts 6 placed one on another in a plurality of layers, and each belt 6 is formed in the form of a belt in which belt cords are covered with belt rubber.

Side wall portions 8 are formed on outer surfaces of the opposite side portions of the carcass ply 3.

A bead portion 9 covers each annular end portion of the carcass ply 3 and is wound and folded back on each bead ring 2. The bead portion 9 is continuous on the inner side thereof to the inner liner portion 4 and continuous on the outer side thereof to the side wall portion 8.

Figure 2:
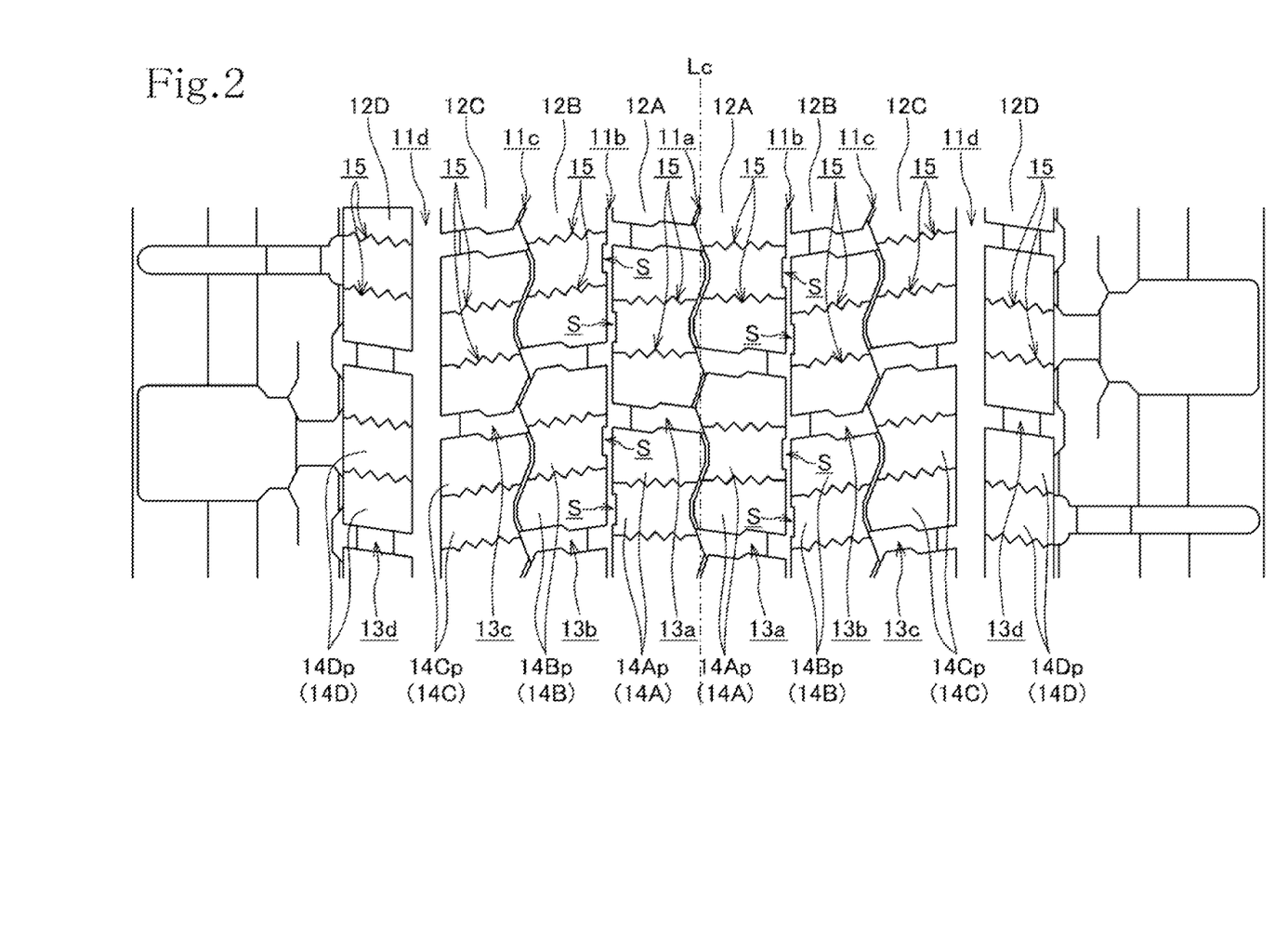
FIG. 2 is a partial development view of a tread of the pneumatic tire.

FIG. 2 is a partial development view of the tread 7.

Referring to FIGS. 1 and 2, seven circumferential grooves extending in a tire circumferential direction are formed in the tread 7. On the opposite outer sides of five inner side circumferential grooves 11c, 11b, 11a, 11b and 11c located on the inner side among the seven circumferential grooves, a pair of outermost side circumferential grooves 11d are formed.

One inner side circumferential groove 11a is formed on a tire equator line Lc in the middle in the tire widthwise direction. The inner side circumferential grooves 11b and 11c on each side of the circumferential groove 11a form a pair, and the two pairs on both sides of the groove 11a are in a symmetrical relation with respect to the tire equator line Lc. Further, on the further outer sides of the inner side circumferential grooves 11c paired with each other, the pair of outermost side circumferential grooves 11d are formed, respectively.

The tread 7 is partitioned, by the seven circumferential grooves, into eight land portions continuous in the circumferential direction. Between the pair of outermost side circumferential grooves 11d, inner side land portions 12B, 12A, 12A and 12B are partitioned and formed. These inner side land portions are located between the inner side circumferential grooves 11a, 11b, and 11c. Outer side land portions 12C are partitioned and formed between the outermost side circumferential groove 11d and the inner side circumferential groove 11c, respectively. Shoulder land portions 12D are arrayed on the outer sides of the outermost side circumferential grooves 11d.

The inner side circumferential grooves 11a, 11b, and 11c are smaller in groove width than the outermost side circumferential grooves 11d. The groove width of the inner side circumferential grooves are such as to allow, upon grounding of the tire, the land portions on the opposite sides thereof to come into contact with each other.

The inner side circumferential grooves 11a and 11c extend in a zigzag shape in the tire circumferential direction, so as to be repetitively deflected in the tire widthwise directions.

On the other hand, the inner side circumferential grooves 11b extend linearly in the tire circumferential direction.

The inner side land portions 12A and 12B are divided into a plurality of blocks 14A and 14B by inner side widthwise grooves 13a and 13b, respectively.

The outer side land portions 12C are divided into a plurality of blocks 14C by outer side widthwise grooves 13c.

The shoulder land portions 12D are also divided into a plurality of blocks 14D by shoulder widthwise grooves 13d.

The inner side widthwise grooves 13a and 13b, the outer side widthwise grooves 13c, and the shoulder widthwise grooves 13d have a groove width substantially equal to that of the outermost side circumferential grooves 11d.

The blocks 14A, 14B, 14C, and 14D are each segmented into a plurality of segmented blocks 14Ap, 14Bp, 14Cp, and 14Dp by a plurality of widthwise sipes 15 extending in the tire widthwise direction.

The widthwise sipes 15 extend in a zigzag shape in the tire widthwise directions while repetitively deflecting in the tire circumferential directions.

The inner side widthwise grooves 13a, formed in the inner side land portions 12A adjacent to each other in the tire widthwise direction with the inner side circumferential groove 11a interposed therebetween, are formed in a mutually displaced relation with each other in the tire circumferential direction. Therefore, the blocks 14A, which are divided by the inner side widthwise grooves 13a and are adjacent to each other in the tire widthwise direction, are arrayed in a displaced relation in a zigzag pattern in the tire circumferential direction.

Since inner side widthwise grooves 13a and 13b, formed in the inner side land portions 12A and 12B adjacent to each other in the tire widthwise direction with the inner side circumferential groove 11b interposed therebetween, are formed in a displaced relation with each other in the tire circumferential direction, the blocks 14A and 14B, which are divided by the inner side widthwise grooves 13a and 13b and are adjacent to each other in the tire widthwise direction, are arrayed in a displaced relation in a zigzag pattern in the tire circumferential direction.

The inner side widthwise grooves 13b and the outer side widthwise grooves 13c, formed in the inner side land portions 12B and the outer side land portions 12C adjacent to each other in the tire widthwise direction with the inner side circumferential grooves 11c interposed therebetween, are formed in a displaced relation with each other in the tire circumferential direction. For this reason, the blocks 14B and the blocks 14C that are each divided by the inner side widthwise grooves 13b and the outer side widthwise grooves 13c and are adjacent to each other in the tire widthwise direction, respectively, are arrayed in a displaced relation with each other in the tire circumferential direction.

In the inner side circumferential grooves 11b extending linearly in the tire circumferential direction among the inner side circumferential grooves 11a, 11b, and 11c, a plurality of cut recessed portions S are formed in block wall faces 14Af and 14Bf, which are opposed to each other, of the blocks 14A and 14B on the opposite sides of the inner side circumferential grooves 11b.

Figure 3:
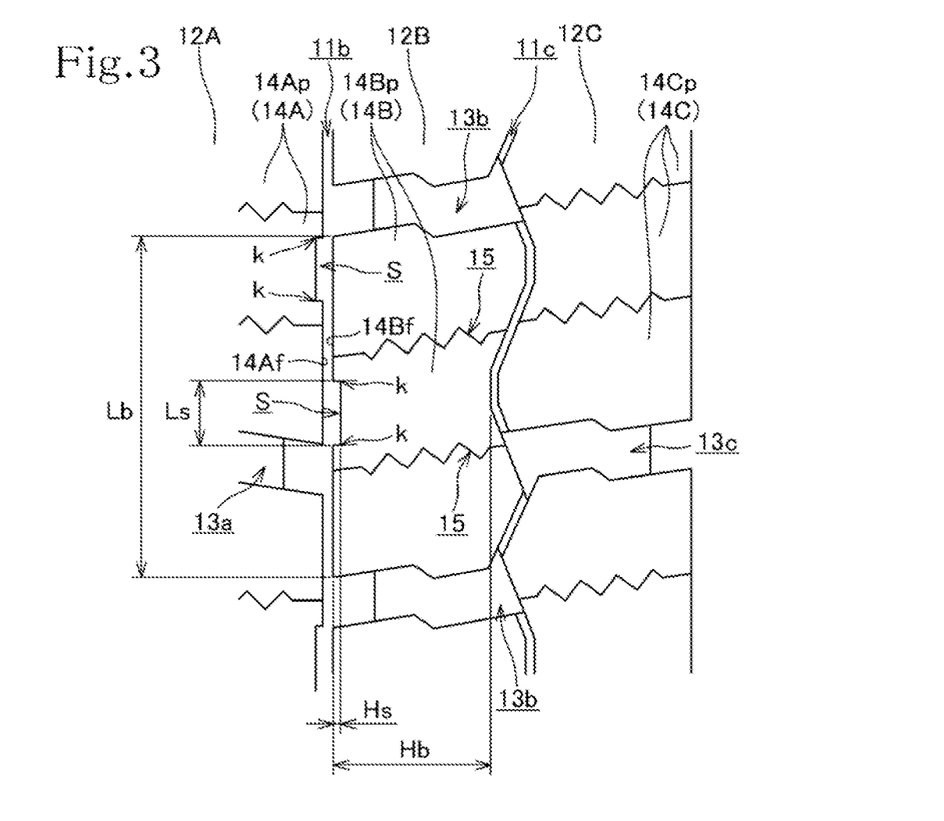
FIG. 3 is a partial enlarged plan view of an inner side land portion of the tread.

FIG. 3 is a partial enlarged plan view depicting part of the inner side circumferential groove 11b and associated portions on an enlarged scale.

Referring to FIG. 3, the recessed portions S formed in the opposed block wall faces 14Af and 14Bf of the blocks 14A and 14B have a shape formed by cutting the block wall faces 14Af and 14Bf in a channel shape and have a rectangular shape elongated in the tire circumferential direction as viewed in plan.

Figure 4:
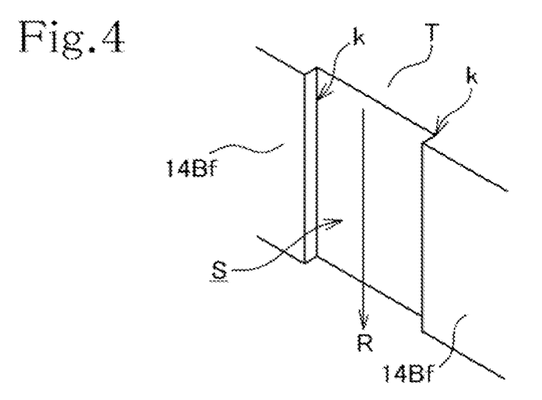
FIG. 4 is a perspective view of a recessed portion of the inner side land portion.

In particular, the recessed portion S has a shape cut in a radial direction R from a tread face T, as depicted in FIG. 4.

The recessed portion S is formed at a position that is displaced in the tire circumferential direction from and does not overlap with the widthwise grooves 13a (13b) that divide the land portion 12A (12B) to which the recessed portion S is opposed across the inner side circumferential groove 11b.

Accordingly, the recessed portions S are not opposed to the widthwise grooves 13a and 13b across the inner side circumferential groove 11b but are opposed to the block wall faces 14Af and 14Bf of the blocks 14A and 14B.

Further, the recessed portion S is formed at a position that is displaced in the tire circumferential direction from and does not overlap with the widthwise sipes 15 formed in the block 14A or 14B that has the recessed portion S.

The block 14A is segmented into three segmented blocks 14Ap by two widthwise sipes 15 and 15, and the recessed portion S is formed between the two widthwise sipes 15 and 15.

Similarly, also in the block 14B, the recessed portion S is formed between two widthwise sipes 15 and 15.

Referring to FIG. 3, a widthwise dimension Hs of the recessed portion S in the tire widthwise direction is 7% of a block width Hb of the block 14B (14A) in the tire widthwise direction, the block width Hb including the recessed portion S at a position on a tire circumferential line at which the recessed portion S is formed.

Further, referring to FIG. 3, a circumferential length Ls of the recessed portion S in the tire circumferential direction is 15% of a block length Lb of the block 14B (14A) in the tire circumferential direction at a position on a tire widthwise line on which the recessed portion S is formed.

The first embodiment according to the present invention described in detail above provides the following advantageous effects.

The five inner side circumferential grooves 11c, 11b, 11a, 11b, and 11c, arrayed between the pair of outermost side circumferential grooves 11d, have a groove width that is smaller than that of the outermost side circumferential grooves 11d. Therefore, upon grounding, the land portions 12A, 12B, and 12C on the opposite sides of the inner side circumferential grooves 11a, 11b are caused to come into contact with each other. As a result, even though the recessed portions S are provided in the block wall faces 14Af and 14Bf of the blocks 14A and 14B, the plurality of inner side land portions 12A, 12B, and 12C are integrated with each other to increase the rigidity as a whole. Consequently, even if the segmented blocks 14Ap, 14Bp, and 14Cp segmented by the widthwise sipes 15 are acted upon by a high ground contact pressure, they are suppressed from being deformed greatly, and also the heel-and-toe uneven wear is suppressed.

Further, in the opposed block wall faces 14Af and 14Bf of the blocks 14A and 14B on the opposite sides of the inner side circumferential groove 11b, a plurality of recessed portions S of rectangular shape as viewed in plan are formed, and the recessed portions S have a shape cut in a radial direction from the tread surface. Therefore, in addition to snow column shearing force generated by the widthwise grooves 13a, 13b, 13c, and 13d, there is produced snow column shearing force to snow columns generated by the recessed portions S of the block wall faces 14Af and 14Bf. Consequently, the performance on snow is further improved.

Also, there is an edge effect of tread face opening edges of the recessed portions S of rectangular shape as viewed in plan on the opposing block wall faces 14Af and 14Bf of the blocks 14A and 14B.

Referring to FIG. 2, the recessed portions S of rectangular shape as viewed in plan are formed at positions displaced from each other in the tire circumferential direction and do not overlap with the widthwise groove 13a (13b) that divides the land portion 12A (12B) to which the recessed portions S are opposed across the inner side circumferential groove 11b. Therefore, the recessed portions S are not opposed to the widthwise grooves 13a (13b) across the inner side circumferential groove 11b but is opposed to the block wall face 14Af (14Bf) of the block 14A (14B).

Therefore, upon grounding, the recessed portions S formed in the block wall faces 14Af and 14Bf of the blocks 14A and 14B have the recessed portion openings closed by contact of the opening end faces of the recessed portions S with the opposing block wall faces 14Bf and 14Af of the blocks 14B and 14A. Therefore, the snow column shearing force acts effectively on snow columns formed by the recessed portions S having the closed openings, and the block ends that are deformed much upon grounding do not have a direct influence on the recessed portions S. As a consequence, concentration of distortion upon angular portions k of the recessed portions S of the blocks 14A and 14B can be suppressed, and occurrence of a crack due to the angular portions k can be suppressed (refer to FIG. 3).

The recessed portions S of a rectangular shape as viewed in plan are formed at positions displaced in the tire circumferential direction from the widthwise sipes 15 formed on the blocks 14A and 14B that have the recessed portions S and do not overlap with the widthwise sipes 15. Therefore, upon grounding, the influence of the end portions of the segmented blocks 14Ap and 14Bp that are deformed much due to the widthwise sipes 15 is prevented from causing a direct influence on the recessed portions S. Consequently, concentration of distortion upon the angular portions k of the recessed portions S of the segmented blocks 14Ap and 14Bp can be suppressed, and occurrence of a crack at the angular portions k can be suppressed (refer to FIG. 3).

The widthwise dimension Hs of the recessed portion S of a rectangular shape as viewed in plan in the tire widthwise dimension is 7% of the block width Hb of the block 14B (14A) in the tire widthwise direction, the block width Hb including the recessed portion S at the position in the tire circumferential direction at which the recessed portion S is formed. Therefore, the snow column shearing force is secured by the recessed portion S. Further, when the blocks 14A and 14B on the opposite sides of the inner side circumferential groove 11b of a small groove width are caused to contact and integrated with each other upon grounding, sufficient entire rigidity is secured, deformation is suppressed, and also occurrence of a crack at the angular portions k of the recessed portions S is suppressed.

It is to be noted that, if the widthwise dimension Hs of the recessed portion S in the tire widthwise direction is equal to or greater than 5% and is equal to or smaller than 25% of the block width Hb, then the snow column shearing force is secured by the recessed portions S, and upon grounding, the blocks 14A and 14B are caused to contact with and be integrated with each other to suppress deformation and also suppress occurrence of a crack at the angular portions k of the recessed portions S.

Since the circumferential length Ls of the recessed portion S of a rectangular shape as viewed in plan in the tire circumferential direction is 15% of the block length Lb of the block 14B (14A) in the tire circumferential direction at a position on a tire widthwise line at which the recessed portion S is formed, the snow column shearing force is secured by the recessed portions S, and, upon grounding, the blocks 14A and 14B on the opposite sides of the small-width inner side circumferential groove 11b are contacted and integrated with each other. Consequently, deformation is suppressed, and also occurrence of a crack at the angular portions k of the recessed portion S is suppressed.

It is to be noted that, if the circumferential length Ls of the recessed portion S in the tire circumferential direction is equal to or greater than 5% and is equal to or smaller than 35% of the block length Lb, then the snow column shearing force is secured by the recessed portions S, and upon grounding, the blocks 14A and 14B are contacted and integrated with each other to suppress deformation and also suppress occurrence of a crack at the angular portions k of the recessed portion S.

A tread of a pneumatic tire according to another embodiment will be described with reference to FIGS. 5 and 6.

Figure 5:
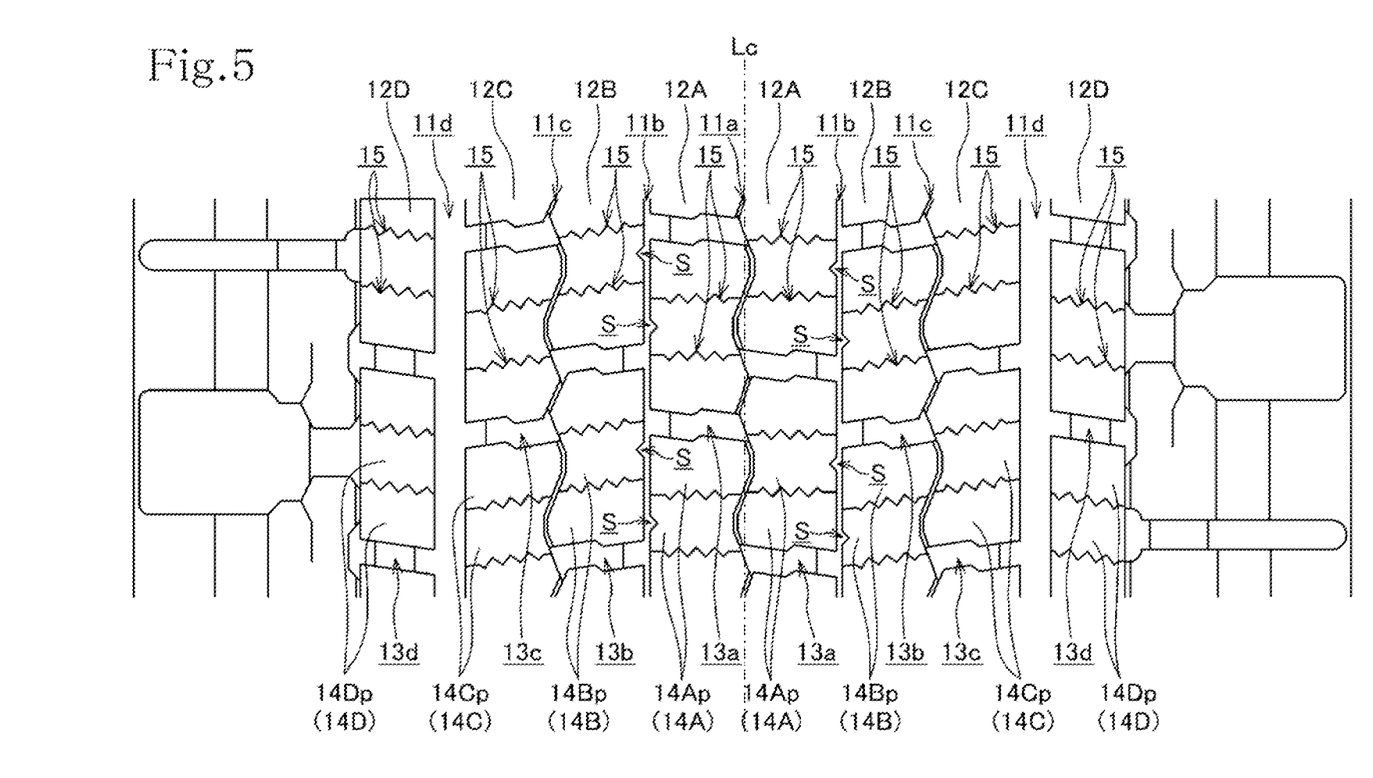
FIG. 5 is a partial development view of a tread of a pneumatic tire according to another embodiment.
Figure 6:
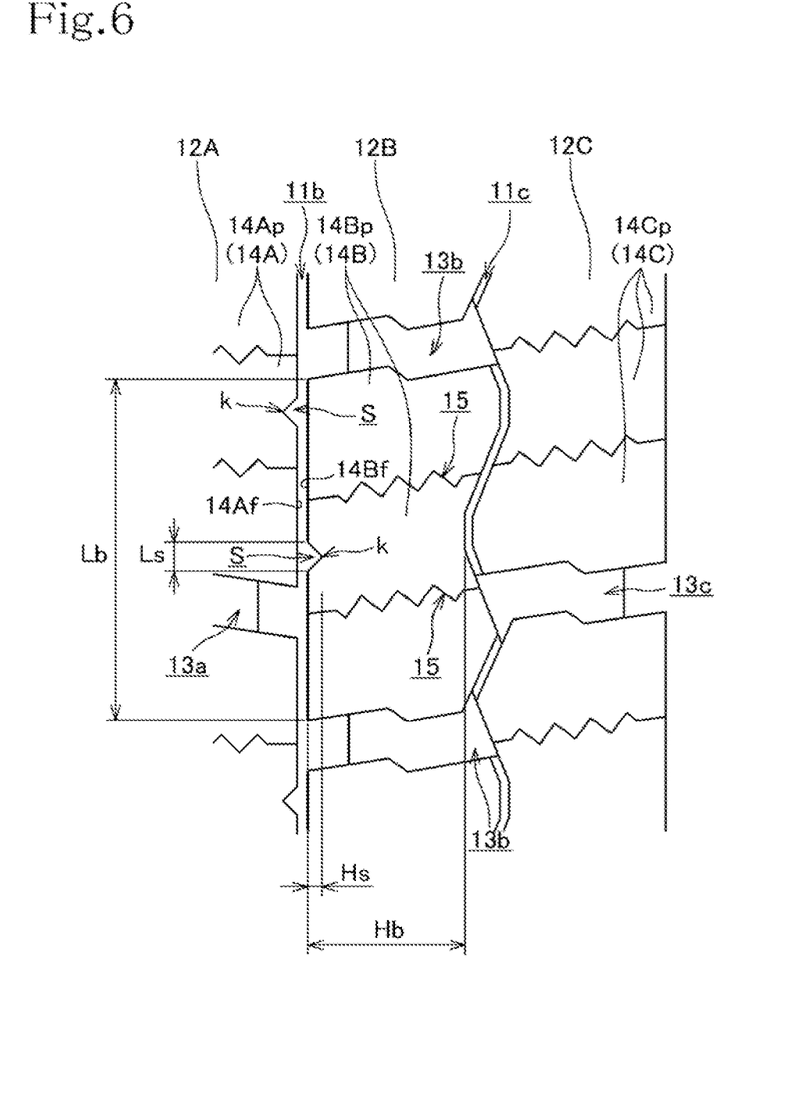
FIG. 6 is a partial enlarged plan view of an inner side land portion of the tread.

FIG. 5 is a partial development view of a tread pattern of the pneumatic tire, and FIG. 6 is a partial enlarged plan view of an inner side land portion of the tread.

The tread pattern of the pneumatic tire of the present embodiment has a pattern shape substantially same as that of the tread pattern of the pneumatic tire of the embodiment described hereinabove except that the shape of the recessed portions S is different, and, for reference signs, like reference signs to those in the embodiment described above will be used.

Recessed portion S are cut in the radial direction R from the tread face T on the opposed block wall faces 14Af and 14Bf of the blocks 14A and 14B on the opposite sides of the inner side circumferential groove 11b formed on the tread of the present pneumatic tire. The recessed portion S have a triangular shape as viewed in plan.

The inner side land portions 12A, 12B, and 12C on the opposite sides of the small-width inner side circumferential grooves 11a, 11b, and 11c are caused to contact with each other, upon grounding. Consequently, even though the recessed portions S of a triangular shape as viewed in plan are provided on the block wall faces 14Af and 14Bf of the blocks 14A and 14B on the opposite sides of the inner side circumferential groove 11b, the plurality of inner side land portions 12A, 12B, and 12C are integrated with each other to increase the rigidity as a whole. Further, even if the segmented blocks 14Ap, 14Bp, and 14Cp segmented by the widthwise sipes 15 are acted upon by a high ground contact pressure, they are suppressed from being deformed greatly, and the heel-and-toe uneven wear is suppressed.

Further, on the opposed block wall faces 14Af and 14Bf of the blocks 14A and 14B on the opposite sides of the inner side circumferential groove 11b, a plurality of recessed portions S of a triangular shape as viewed in plan are formed and the recessed portions S have a shape cut in a radial direction from the tread face. Therefore, in addition to snow column shearing force generated by the widthwise grooves 13a, 13b, 13c, and 13d, snow column shearing force to snow columns generated by the recessed portions S of the block wall faces 14Af and 14Bf is added, and consequently, the performance on snow is further improved.

Further, there is additionally provided an edge effect of tread face opening edges of the recessed portions S of a triangular shape as viewed in plan on the opposing block wall faces 14Af and 14Bf of the blocks 14A and 14B.

The recessed portion S of a triangular shape as viewed in plan is formed at a position that is displaced in the tire circumferential direction from and does not overlap with the widthwise groove 13a (13b) that divides the land portion 12A (12B) to which the recessed portion S is opposed across the inner side circumferential groove 11b.

Therefore, upon grounding, the recessed portions S are deformed in such a way that openings of the recessed portions S are closed, due to contact of the opening end faces of the recessed portions S formed on the block wall faces 14Af and 14Bf of the blocks 14A and 14B with the block wall faces 14Bf and 14Af of the opposed blocks 14B and 14A. Therefore, the snow column shearing force to snow columns formed by the recessed portions S having the closed openings acts effectively, and the block ends that are deformed much upon grounding do not have a direct influence on the recessed portions S. Therefore, concentration of distortion upon the angular portions k of the recessed portions S of the blocks 14A and 14B can be suppressed, and occurrence of a crack from the angular portions k can be suppressed (refer to FIG. 6).

The recessed portion S of a triangular shape as viewed in plan is formed at a position that is displaced in the tire circumferential direction from and does not overlap with the widthwise sipes 15 formed on the blocks 14A and 14B that have the recessed portions S.

Therefore, upon grounding, the end portions of the segmented blocks 14Ap and 14Bp, which are deformed much, are prevented from having a direct influence on the recessed portions S, by the widthwise sipes 15. Therefore, concentration of distortion upon the angular portions k of the recessed portions S of the segmented blocks 14Ap and 14Bp can be suppressed, and occurrence of a crack from the angular portions k can be suppressed (refer to FIG. 6).

Referring to FIG. 6, the widthwise dimension Hs of the recessed portion S of a triangular shape as viewed in plan in the tire widthwise direction is 10% of the block width Hb of the block 14B (14A) in the tire widthwise direction in a state in which the recessed portion S is not formed. The widthwise dimension Hs is equal to or greater than 5% and equal to or smaller than 25% of the block width Hb. Therefore, the snow column shearing force is secured by the recessed portion S, and upon grounding, the blocks 14A and 14B are contacted and integrated with each other to suppress deformation and also suppress occurrence of a crack at the angular portions k of the recessed portion S.

Referring to FIG. 6, the circumferential length Ls of the recessed portion S of a triangular shape as viewed in plan in the tire circumferential direction is 9% of the block length Lb of the block 14B (14A) in the tire circumferential direction at a tire widthwise position at which the recessed portion S is formed. The circumferential length Ls is equal to or greater than 5% and equal to or smaller than 35% of the block length Lb. Therefore, the snow column shearing force is secured by the recessed portion S, and upon grounding, the blocks 14A and 14B are contacted and integrated with each other to suppress deformation and also suppress occurrence of a crack at the angular portions k of the recessed portion S.

Although the pneumatic tires according to the two embodiments of the invention have been described, the mode of the present invention is not limited to the embodiments described above and includes what is carried out in various modes without departing from the subject matter of the present invention.

For example, as regards the shape as viewed in plan of the recessed portions S formed in the opposed block wall faces 14Af and 14Bf of the blocks 14A and 14B on the opposite sides of the inner side circumferential groove 11b, various shapes are usable in addition to a rectangular shape and a triangular shape.

The pneumatic tire of the present invention can be applied not only to tires for trucks and buses but also to tires for passenger cars.

REFERENCE SIGNS LIST

1 . . . Pneumatic tire, 2 . . . Bead ring, 3 . . . Carcass ply, 4 . . . Inner liner portion, 5 . . . Belt layer, 6 . . . Belt, 7 . . . Tread, 8 . . . Side wall portion, 9 . . . Bead portion, 11a, 11b, 11c . . . Inner side circumferential groove, 11d . . . Outermost side circumferential groove, 12A, 12B . . . Inner side land portion, 12C . . . Outer side land portion, 12D . . . Shoulder land portion, 13a, 13b . . . Inner side widthwise groove, 13c . . . Outer side widthwise groove, 14A, 14B, 14C, 14D . . . Block, 14Af, 14Bf . . . Block wall face, 15 . . . Widthwise sipe, S . . . Recessed portion.

The invention claimed is:

1. A pneumatic tire in which a tread (7) of the tire is partitioned into a plurality of land portions (12A, 12B, 12C, 12D) that are continuous in a tire circumferential direction, by a plurality of circumferential grooves (11a, 11b, 11c, 11d) extending in the tire circumferential direction, the land portions (12A, 12B, 12C, 12D) continuous in the tire circumferential direction are divided into a plurality of blocks (14A, 14B, 14C, 14D) by a plurality of widthwise grooves (13a, 13b, 13c, 13d) extending in a tire widthwise direction, and the blocks (14A, 14B, 14C, 14D) are segmented in a plurality of segmented blocks (14Ap, 14Bp, 14Cp, 14Dp) by a plurality of widthwise sipes (15) extending in the tire widthwise direction, characterized in that:

the circumferential grooves (11a, 11b, 11c, 11d) include a pair of outermost side circumferential grooves (11d, 11d) on outermost sides in the tire widthwise direction and a plurality of inner side circumferential grooves (11a, 11b, 11c) arrayed between the outermost side circumferential grooves (11d, 11d), the inner side circumferential grooves (11a, 11b, 11c) have a groove width that is smaller than that of the outermost side circumferential grooves (11d), to such a degree to allow the land portions on opposite sides thereof to come into contact with each other upon grounding, and a plurality of recessed portions(S) of a shape cut in a radial direction from a tread face are formed along the tire circumferential direction on block wall faces (14Af, 14Bf), which are opposed to each other, of the blocks (14A, 14B) on opposite sides of at least one (11b) of the inner side circumferential grooves, each of the recessed portions(S) has an opening end face configured to be closed by contacting with a block wall face opposed to the recessed portion(S) upon grounding, and the recessed portions(S) are formed at positions that are displaced in the tire circumferential direction from and do not overlap with widthwise sipes (15) formed on the blocks (14A, 14B) that have the recessed portions(S).

2. The pneumatic tire according to claim 1, wherein the recessed portions(S) are formed at positions that are displaced in the tire circumferential direction from and do not overlap with the widthwise grooves (13a, 13b) that divide the land portions (12A, 12B) to which the recessed portions (S) are opposed across the inner side circumferential groove (11b).

3. The pneumatic tire according to claim 1, wherein the recessed portions(S) have a widthwise dimension (Hs) in the tire widthwise direction, and the widthwise dimension (Hs) is, at tire circumferential positions of the blocks (14A, 14B) at which the recessed portions(S) are formed, equal to or greater than 5% and equal to or smaller than 25% of a block width (Hb) of the blocks (14A, 14B) in the tire widthwise direction.

4. The pneumatic tire according to claim 1, wherein the recessed portions(S) have a circumferential length (Ls) in the tire circumferential direction, and the circumferential length (Ls) is, at tire widthwise positions of the blocks (14A, 14B) at which the recessed portions(S) are formed, equal to or greater than 5% and equal to or smaller than 35% of a block length (Lb) of the blocks (14A, 14B) in the tire circumferential direction.

* * * * *